United States Patent
Chamblin

(10) Patent No.: US 11,547,176 B2
(45) Date of Patent: Jan. 10, 2023

(54) DIRECT BOTTOMED ARTICLE OF FOOTWEAR WITH AN INSERT

(71) Applicant: NIKE, Inc., Beaverton, OR (US)

(72) Inventor: Mike A. Chamblin, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/424,072

(22) Filed: May 28, 2019

(65) Prior Publication Data

US 2019/0365027 A1   Dec. 5, 2019

Related U.S. Application Data

(60) Provisional application No. 62/677,986, filed on May 30, 2018.

(51) Int. Cl.
| | | |
|---|---|---|
| *B29D 35/00* | (2010.01) | |
| *B29D 35/08* | (2010.01) | |
| *A43B 13/12* | (2006.01) | |
| *A43B 23/02* | (2006.01) | |

(52) U.S. Cl.
CPC ........ *A43B 13/122* (2013.01); *B29D 35/0009* (2013.01); *B29D 35/0036* (2013.01); *B29D 35/082* (2013.01); *A43B 23/02* (2013.01)

(58) Field of Classification Search
CPC . B29D 35/0036; B29D 35/082; B29D 35/084
See application file for complete search history.

(56) References Cited

U.S. PATENT DOCUMENTS

| 5,193,240 A | * | 3/1993 | Salpietro | A43B 1/0072 |
| | | | | 12/142 RS |
| 5,453,230 A | * | 9/1995 | McClellan | B29C 41/04 |
| | | | | 264/46.7 |
| 6,457,263 B1 | | 10/2002 | Rudy | |
| 8,127,468 B2 | | 3/2012 | Morgan | |
| 9,282,785 B2 | | 3/2016 | Grondin | |

(Continued)

FOREIGN PATENT DOCUMENTS

| CN | 1419424 A | 5/2003 |
| CN | 1524470 A | 9/2004 |

(Continued)

OTHER PUBLICATIONS

International Preliminary Report on Patentability Received for PCT Patent Application No. PCT/US2019/017108, dated Aug. 20, 2020, 9 pages.

(Continued)

*Primary Examiner* — Xiao S Zhao
*Assistant Examiner* — John J DeRusso
(74) *Attorney, Agent, or Firm* — Shook, Hardy and Bacon L.L.P.

(57) ABSTRACT

An article of footwear has an upper that is direct attached with the sole. The direct attach sole has an insert, such as an airbag, that forms a portion of a sidewall. The insert is externally visible and forms at least a portion of an external sidewall of the sole. The insert is formed into the direct attach sole by having the insert or a mask temporarily joined with the insert contact a sidewall molding surface of a mold used in the direct attach operation such that the insert results in forming a visible element of the direct attached sole.

10 Claims, 9 Drawing Sheets

(56) References Cited

U.S. PATENT DOCUMENTS

| | | | |
|---|---|---|---|
| 2002/0170650 A1* | 11/2002 | Chi | B29C 44/1233 156/79 |
| 2006/0265908 A1 | 11/2006 | Palmer et al. | |
| 2016/0081426 A1 | 3/2016 | Olivieri | |
| 2017/0000213 A1 | 1/2017 | Mason et al. | |
| 2017/0251751 A1 | 9/2017 | Baghdadi et al. | |
| 2017/0265565 A1 | 9/2017 | Connell et al. | |
| 2019/0239596 A1 | 8/2019 | Ploem | |
| 2021/0059352 A1 | 3/2021 | Ploem | |

FOREIGN PATENT DOCUMENTS

| | | |
|---|---|---|
| CN | 203844072 U | 9/2014 |
| CN | 104125785 A | 10/2014 |
| CN | 105639837 A | 6/2016 |
| CN | 105666908 A | 6/2016 |
| CN | 106108259 A | 11/2016 |
| CN | 106942828 A | 7/2017 |
| DE | 4200730 A1 | 7/1993 |
| EP | 1398140 A1 | 3/2004 |
| FR | 2583269 A1 | 12/1986 |
| JP | 1-280401 A | 11/1989 |
| JP | 5-84769 A | 4/1993 |
| JP | 4880480 B2 | 12/2011 |
| TW | 585750 B | 5/2004 |
| TW | M499789 U | 5/2015 |
| TW | M512936 U | 12/2015 |
| WO | 0101805 A1 | 1/2001 |
| WO | 2016164554 A1 | 10/2016 |

OTHER PUBLICATIONS

Notice of Allowance received for U.S. Appl. No. 16/270,388, dated Aug. 14, 2020, 9 pages.

International Search Report and Written Opinion dated Sep. 18, 2019 in International Patent Application No. PCT/US2019/034410, 15 pages.

International Preliminary Report on Patentability received for PCT Patent Application No. PCT/US2019/034410, dated Dec. 10, 2020, 9 pages.

Notice of Allowance received for U.S. Appl. No. 17/097,947, dated Nov. 29, 2021, 10 pages.

Intention to Grant received for European Patent Application No. 19707202.8, dated Oct. 17, 2022, 6 pages.

* cited by examiner

DIRECT BOTTOMED ARTICLE OF FOOTWEAR WITH AN INSERT

CROSS-REFERENCE TO RELATED APPLICATIONS

This application claims the benefit of priority of U.S. Application No. 62/677,986, titled "Direct Bottomed Article Of Footwear With An Insert," and filed May 30, 2018. The entirety of the aforementioned application is incorporated by reference herein.

TECHNICAL FIELD

Directed to an article of footwear with a direct attached sole.

BACKGROUND

Traditionally, an article of footwear is formed with an upper and a sole that are joined subsequent to the formation of each. This process includes the positioning and aligning of the separate components to then be bonded with various techniques, such as an adhesive.

BRIEF SUMMARY

Aspects hereof contemplate an article of footwear having an upper that is directly attached with the sole. The sole is formed with an insert, such as an airbag, forming at least a portion of an external sidewall surface of the sole during the direct attach operation. The insert results from the molding operation of the sole where the insert having a mask is in contact with a sidewall molding surface of the mold as a polymeric composition is injected in to the mold. The method of forming the direct attached sole with an insert forming a portion of the sidewall also include positioning the insert having the mask relative to the injected materials to form the sole and then repositioning the relative materials to form a coupling there between.

This summary is provided to enlighten and not limit the scope of methods and systems provided hereafter in complete detail.

DESCRIPTION OF THE DRAWINGS

The present invention is described in detail herein with reference to the attached drawing figures, wherein.

DETAILED DESCRIPTION

Figure 1:
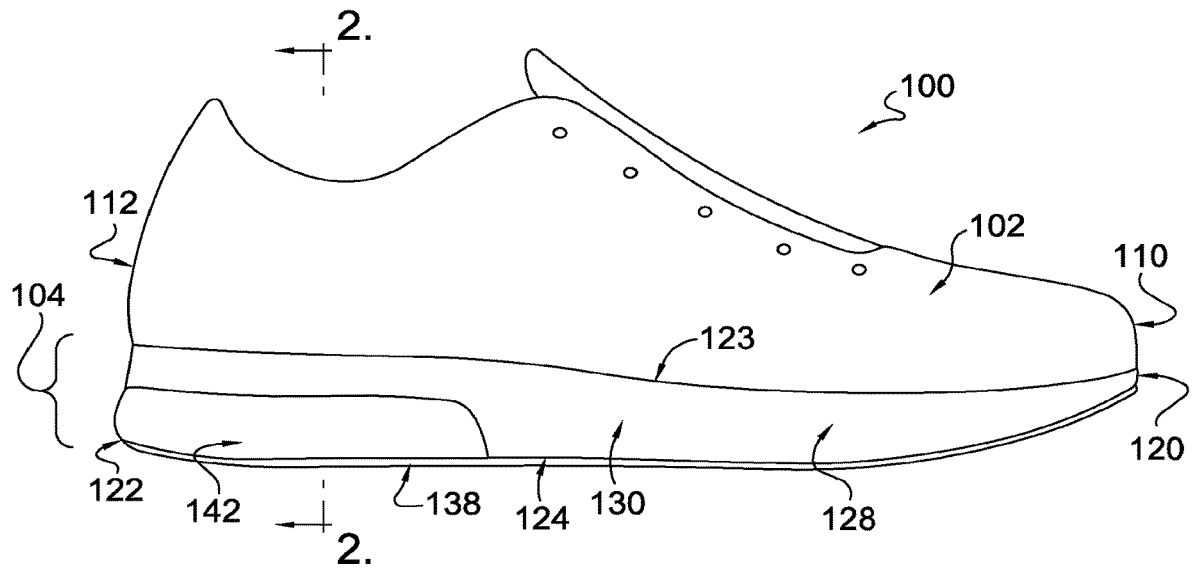
FIG. 1 depicts an article of footwear, in accordance with aspects hereof.

Traditional methods of manufacturing an article of footwear include a variety of processes that are performed in sequence to result in the formation of the footwear (e.g., shoe, cleat, sandal, slipper, and boot). While the present application is directed to an article of footwear, the term "shoe" will be used herein for simplicity. In an effort to reduce manufacturing time, manufacturing cost, and potential defects, an elimination or consolidation of steps being performed is sought. Traditional shoe manufacturing, such as an athletic shoe, includes the formation of a footwear upper ("upper"), the portion of the shoe that secures the shoe to a wearer's foot. The upper is then joined with a footwear bottom unit, which is commonly referred to as a sole. The sole may be comprised of a variety of materials and/or components, such as an outsole, a midsole, and/or an insole. However, any combination of materials/components may be formed and produced in connection with the manufacture of a shoe.

Traditional manufacturing techniques for a shoe include the joining of a formed upper with a formed sole. This joining may be accomplished through use of an adhesive applied to one or more surfaces to be joined of the upper and the sole and then positioning the upper and the sole in contact for the adhesive to couple the components into an article of footwear. This step of joining the upper and the sole introduces a manufacturing process that adds time, cost, and the potential for defects. For example, if the adhesive extends beyond an area to be joined (e.g., beyond a biteline of the upper), the adhesive may be visible and cause a degradation of the aesthetic characteristics of the shoe. Further, the sole and the upper may not be properly aligned during the joining causing a defective shoe. Additionally, the joining process introduces adhesives or other bonding materials into the footwear that can affect performance and feel of the finished article. Further yet, the adhesive or bonding material adds material cost and additional manufacturing inventory to the planning and production for the shoe.

As a result, a concept of direct attach (or sometimes referred to as direct bottoming) is provided. Direct attaching, for purposes of the present disclosure, includes the formation of at least a portion (e.g., a foamed midsole) of the sole with the upper present and results in the sole being joined with the upper. For example, it is contemplated that a molding operation is performed where a polymeric foam composition (e.g., polyurethane ("PU")) is injected into a mold cavity wherein a plantar portion (e.g., under foot portion) of the upper is positioned at the mold cavity. As the polymeric foam composition expands during a foaming process, the polymeric composition interacts with the plantar region of the upper to form at least a mechanical engagement between the polymeric foam composition and the upper material. As the polymeric foam composition cures, the physical engagement between the polymeric foam composition and the upper forms a bond coupling the two together with sufficient bond strength for use as an article of footwear. A direct bottoming process allows for the reduction of materials and or steps during the method of manufacturing. For example, the direct bonding between the polymeric foam composition as it cures and the upper can eliminate the use of an adhesive, in some aspects. Further, as the sole is molded in the presence of the upper, alignment, size, and fit of the sole and upper are better ensured.

Direct attaching of an article of footwear does, however, adjust processing steps for the forming of the footwear relative to a traditional manufacturing process. For example, as the sole is not formed until it is joined with the upper, refinements and processing of the sole is done in the presence of the upper. Therefore, when an insert, such as an airbag, is to be included in the direct attach footwear, the insert is present during the direct attach process. Aspects herein provide for an insert that remains visible to an external observer of the sole while the insert is an integral portion of the sole. In aspects, the insert is an airbag that provides impact attenuation and other physical characteristics that differ from the polymeric foam composition forming other portions of the sole. As a result, insert forms a portion of the sidewall of the sole while the polymeric foam composition forms another portion of the sole sidewall.

Aspects hereof contemplate forming an article of footwear through a direct bottoming process that includes an insert in the sole that forms a portion of the externally visible sole sidewall.

Figure 2:
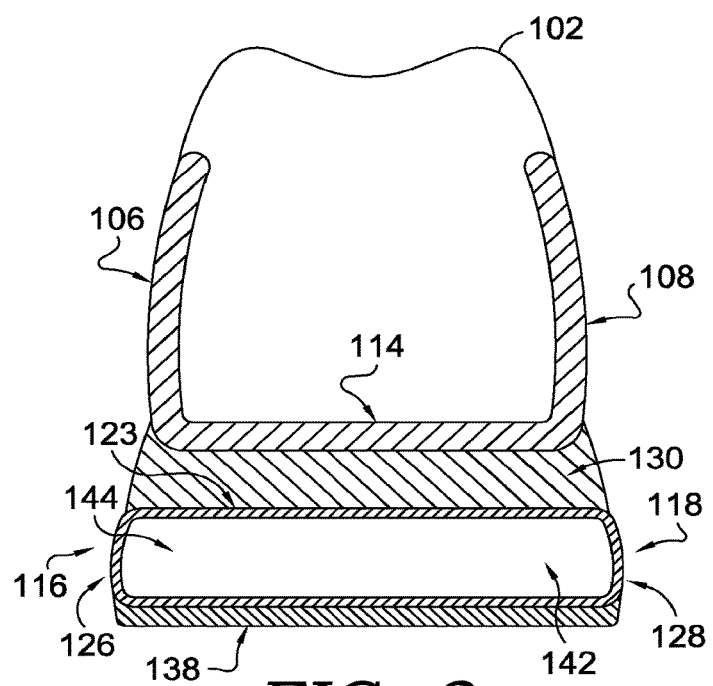
FIG. 2 depicts a cross section of the article of footwear from FIG. 1, in accordance with aspects hereof.

Specifically, turning to FIG. 1 that depicts an article footwear 100 and FIG. 2 that depicts a cross section of the article of footwear 100 along cutline 2-2 from FIG. 1, in accordance with aspects hereof. The article of footwear 100 is formed with an upper 102 comprising a medial side 106, a lateral side 108, a toe end 110, a heel end 112, and a plantar region 114 extending between the medial side 106, the lateral side 108, the toe end 110, and the heel end 112. The article of footwear also includes a sole 104 having a medial side 116, a lateral side 118, a toe end 120, a heel end 122, an upper-facing surface 123 extending between the medial side 116, the lateral side 118, the toe end 120, and the heel end 122, a ground-facing surface 124 opposite the upper-facing surface 123, a sidewall formed from a medial sidewall 126 extending between the ground-facing surface 124 and the upper-facing surface 123 along the medial side 116 and a lateral sidewall 128 extending between the ground-facing surface 124 and the upper-facing surface 123 along the lateral side 118. The sole 104 includes a polymeric foam composition 130 forming at least a portion of the upper-facing surface 123 and engaged with the upper plantar region 114. The sole is also comprised of an insert 142 forming at least a portion of the medial sidewall 126 and/or the lateral sidewall 128.

As provided herein, an insert 142 is a pre-formed component that is not molded as part of the direct-attach process, but instead captured, at least in part, by the direct-attached process forming a shoe. An example of an insert is an airbag. An airbag is a structure having a core containing a volume. The volume may have a pressure differential relative to ambient pressure. For example, an airbag may be formed from a polymer composition film to enclose an internal volume that is pressurized above ambient pressure, such as above 1 atmosphere (atm). Stated differently, an airbag maintains a volume that is maintained above atmospheric pressure. It is contemplated that an insert may be other containers, such as an airbag that also includes tangible materials. The tangible materials may be solid elements (e.g., foamed beads), fluids (e.g., liquid, gel), and/or other fillers contained in a volume, such as a bag similar to an airbag or in a molding volume formed, at least in part, through a mold used in the direct attach process. Further, an insert may be a stability element, a support element, a spring element, a traction element (e.g., cleat), and/or other supplemental component effective to enhance a sole for an article of footwear.

The insert forms a portion of a sidewall when the insert is external visible as a portion of the sole sidewall. Stated differently, the insert forms an external surface of the sole sidewall. As will be discussed in greater detail hereinafter, the insert is able to form a portion of a sidewall of the sole through the direct attach process by positioning the insert against a molding surface of a mold used during the direct attached process prior to injecting a polymeric composition, such as a polymeric foam composition. The contact between the insert and the molding surface prevents the injected polymeric composition from encasing the insert completely and therefore allowing the insert to form at least a portion of the sole sidewall external surface.

As will be provided in greater detail herein, the sole 104 is formed from the polymeric foam composition 130 that is direct attached to the upper 102 during the sole 104 forming process. The sole 104 may also include an outsole 138. As will be described in greater detail herein, the outsole 138 may be formed in a continuous direct attach process. Alternatively, the outsole may be inserted into a mold cavity used for forming the polymeric foam composition 130 for direct attach to the upper 102. In yet further examples, the injected polymeric foam composition 130 may form the outsole without additional/alternative materials forming a ground-contacting material. Further yet, the insert 142 may form at least a portion of a ground-contacting surface to supplement or eliminate a separate outsole. As used herein, a ground-contacting surface and a ground-facing surface are not always equivalent. The ground-contacting surface is a surface intended to form an interaction with the ground. A ground-facing surface is oriented similarly to a ground-contacting surface, but a ground-facing surface may contact intervening materials of the sole prior to the ground. For example, a traditional midsole has a ground-facing surface that interfaces, at least in part, with an outsole. The outsole in this example has a ground-facing surface that is also the shoe's ground-contacting surface.

Figure 6:
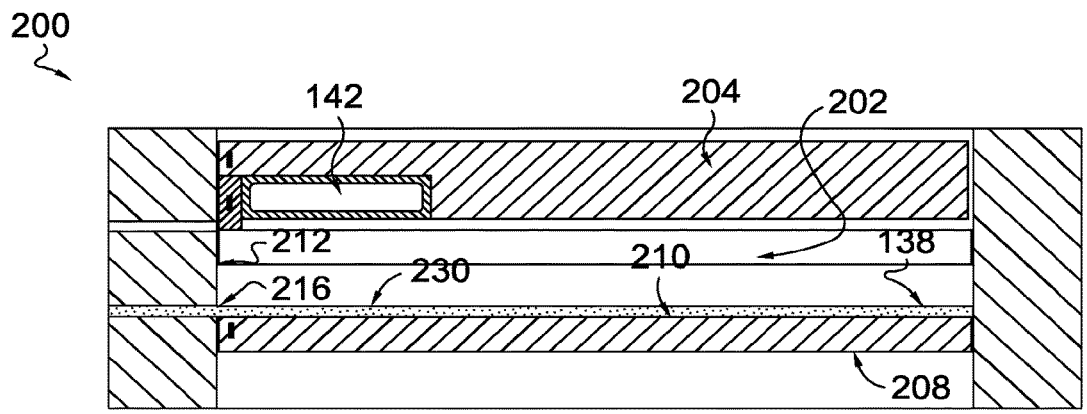
FIG. 6 depicts the mold from FIG. 5 with the top platen positioned in the mold and a polymeric composition being injected into the mold, in accordance with aspects hereof.

The polymeric foam composition 130 may be any polymeric composition. Foam is a cellular structure with either open celled or closed cell structures of polymeric composition and voids, such as gas voids. In an example, the polymeric foam composition is a polyurethane ("PU") composition. The PU may be chemically foamed or mechanically foamed during a curing process to result in a polymeric foamed composition. The polymeric foam composition may include additional components, such as colorants and other additives. While PU composition is specifically listed, other polymeric compositions are contemplated, such as ethylene-vinyl acetate, low-density polyethylene, nitrile rubber, polychloroprene, polyimide, polypropylene, polystyrene, polyvinyl chloride, silicone, and the like. However, as will be discussed in greater detail, bonding affinity between the polymeric foam composition 130 and a polymeric composition 230 (as seen in FIG. 6, for example) of an outsole during the curing phase of the polymeric foam composition 130 drives manufacturing efficiencies. An exemplary combination of materials that have sufficient bonding affinity are PU as the polymeric foam composition 130 and PU as the polymeric composition 230.

The upper 102 may be formed from any material, such as animal-based fibers (e.g., wool, hair, silk), plant-based fiber, and/or synthetic fibers. In an exemplary aspect, the upper 102 is formed from a textile material having one or more fibers in the plantar region 114. The fibers in the plantar region 114 provide a surface to which the polymeric foam composition 130 may interact and mechanically bond therewith. For example, the upper 102 may be formed from a knit, woven, braided, non-woven, and the like textile comprising one or more yarns, filaments, and/or fibers that provide a surface amenable for direct bottoming. In some aspect, the upper 102 in at least the plantar region 114 includes a porous structure that allows a yet-to-be cured (e.g., fluid-like and/or flowable properties that allow the polymeric composition to flow around and/or through the porous structure) polymeric composition to infiltrate and/or at least partially encapsulate some of the fibrous elements forming the textile. Once encapsulated, the polymeric composition cures to a solid or more resilient state (e.g., cures as a foamed polymeric composition) forming a mechanical bond with the upper 102 through the interaction with the encapsulated fibrous elements.

Further, it is contemplated that a chemical bond may additionally or alternatively be formed by the polymeric foam composition and the upper as the polymeric foam composition cures to a foamed polymeric composition state. The chemical bond is contemplated when compositions having an affinity for chemical bonding, such as an upper having PU and/or TPU compositions forming at least a portion of the plantar region 114 (e.g., a knit upper having TPU and/or PU yarns integrally knit in at least the plantar region 114) and the polymeric foam composition 130 comprises a PU composition. In this example, the upper and the polymeric foam composition form a direct attach bond through mechanical engagement and/or chemical engagement of the various compositions.

Similarly, it is contemplated that a chemical bond may be formed between the polymeric foam composition 130 and the polymeric composition 230 to join the two compositions. As such, it is contemplated that the polymeric foam composition 130 and the polymeric composition 230 are selected to have a sufficient chemical bonding affinity to resist delamination.

The insert 142 is contemplated as being formed from a material to which the polymeric foam composition 130 has sufficient bonding affinity to prevent a delamination between the insert 142 and the polymeric foam composition 130. For example, the insert 142 may be formed having a surface with thermoplastic polyurethane (TPU) that bonds sufficiently with a PU composition forming the polymeric foam composition 130. Further, in examples where an outsole is also formed during a direct attach process, a sufficient bonding affinity between the insert 142 and the polymeric composition 230 is selected. In this example, if the polymeric composition 230 forming the outsole 138 is a PU, then a TPU (or PU) material forming the insert 142 may be selected. In some examples, the insert is an airbag that is formed from a polymeric film. The polymeric film may be a laminated composite comprising a plurality of polymeric compositions. An exterior layer of the laminate composition may be formed from a material (e.g., TPU) to which a sufficient bonding affinity with one or more of the polymeric foam composition 130 and/or the polymeric composition 230 exist. The insert may be formed from other materials. For example, an insert may have a mechanical engagement portion, such as an aperture or other physical element that aid in securement to one or more of the polymeric foam composition 130 and/or the polymeric composition 230.

The insert 142 may be located at any position of the sole 104. In the example of FIG. 1, the insert 142 is an airbag positioned in the heel end 122 and exposed on the sidewalls, such as the lateral sidewall 128. The insert 142 extends toewardly from the heel end 122 to form a sole insert supporting a wearer's heel. The airbag may be pressurized to a sufficient level to provide impact attenuation and resilience to wearer impact forces. If the wearer has a heel strike in the shoe, where the heel end 122 make initial contact with the ground, the insert 142 enhances the ability of the shoe to absorb and respond to that impact. Similarly, depending on an intended use of the insert, it is understood that the insert may form any portion of the sole 104. For example, the insert may be in a toe end, a medial side, a lateral side, and any combination thereof. Further, the insert may extend the whole length or width of the sole 104.

FIG. 2 depicts a cross section of the article of footwear 100, in accordance with aspects hereof. The upper 102 and the sole 104 are illustrated. The sole 104 is formed from the polymeric foam composition 130, the insert 142, and the outsole 138.

As depicted in FIG. 2, the insert 142 is vertically positioned between the polymeric foam composition 130 and the outsole 138. The insert 142 is, however, forming a portion of both the medial sidewall 126 and the lateral sidewall 128. Also depicted, the insert 142 forms an internal cavity 144. The internal cavity 144 is a volume containing pressurized gas, such as pressurized nitrogen, above 1 atm (i.e., 14.695 pounds per square inch ("Psi")), above 20 Psi, or above 25 Psi. The internal cavity 144 is an enclosed volume effective to maintain for a prescribed period of time the pressurized gas. In other examples, the internal cavity 144 is filled with additional materials, such as foam beads, liquids, gels, and the like. Alternatively, an insert may not include an internal cavity, but instead may be a solid or semi-solid component.

The outsole 138 is bonded with the insert 142. The outsole 138 may be bonded through chemical and/or physical bonds, as discussed previously. As will be depicted in the FIGS. 6-8, one method of bonding the outsole 138 with the insert 142 is through contacting the outsole 138 with the insert 142 prior to the outsole 138 fully curing from a molding operation. Prior to a complete cure, the outsole 138 adheres with the insert 142 to couple the insert 142 and the outsole 138. In alternative examples, an adhesive, such as a glue, may be applied to one or more of the insert 142 and/or the outsole 138 to form a bond there between.

As used herein, the term "couple" or derivations thereof (e.g., coupled) refer to elements that join, bond, attach, bind, connect, and/or unite. Therefore, when a first element is coupled with a second element, the first and second elements are permanently or temporarily joined as a physical unit. The coupling between two elements may be accomplished through mechanical connections and/or chemical adhesion. Two elements may be coupled through a manufacturing process (e.g., application of heat, application of pressure), through supplemental materials (e.g., glue, adhesive), through material state modification (e.g., connection due to curing, welding, melting), and the like. The coupling of two elements includes an engagement between the elements. An engagement is the coupling, through at least a physical contact, between the two elements. An engagement does not solely rely on a mechanical bond, but instead may also include or exclusively include a chemical bond between the elements engaged. In examples provided herein, an engagement results when a yet-to-be-cured polymeric foam composition contacts an upper material. The polymeric foam composition physically interacts (e.g., infiltrates, intermingles, contacts, encapsulates, seeps) with the upper to form an engagement. A direct attach sole is attached to an upper without additional adhesives used to join the upper and the sole. Stated differently, a direct attach generally does not use an adhesive to join an upper and sole, but instead, relies on the engagement created by injecting a polymeric foam composition into contact with the upper. While some direct attach soles are engaged with the upper through a mechanical connection between the polymeric foam composition and the upper, other direct attach soles are engaged with the upper through a chemical bond.

The polymeric foam composition 130 is depicted as extending between the upper 104 and the insert 142. In this example, the polymeric foam composition 130 may serve a joining material between the upper 104 and the insert 142. Further, in this example, the polymeric foam composition 130 forms an upper-facing surface 123. The upper-facing surface 123 is a surface that interacts with the plantar region 114 of the upper 104 to form a coupling there between.

The article of footwear 100 as depicted in FIG. 2 shows the upper 102, the lateral side 108, the medial side 106, and the plantar region 114. At the plantar region 114 the polymeric foam composition 130 is mechanically engaged with the upper 102. While not depicted, in some aspects it is contemplated that the cross sectional view will depicts at least a portion of the polymeric foam composition 130 extending into the material forming the plantar region 114 forming a mechanical bond.

Figure 3:
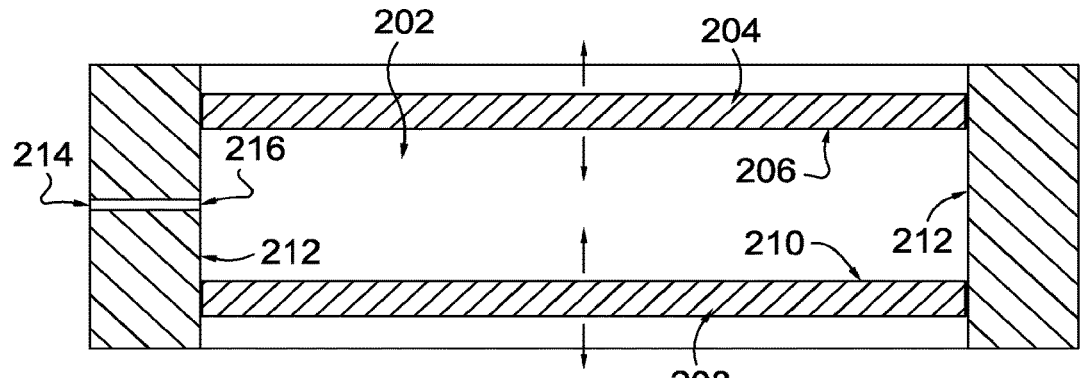
FIG. 3 depicts an example mold having a single runner, in accordance with aspects hereof.
Figure 15:
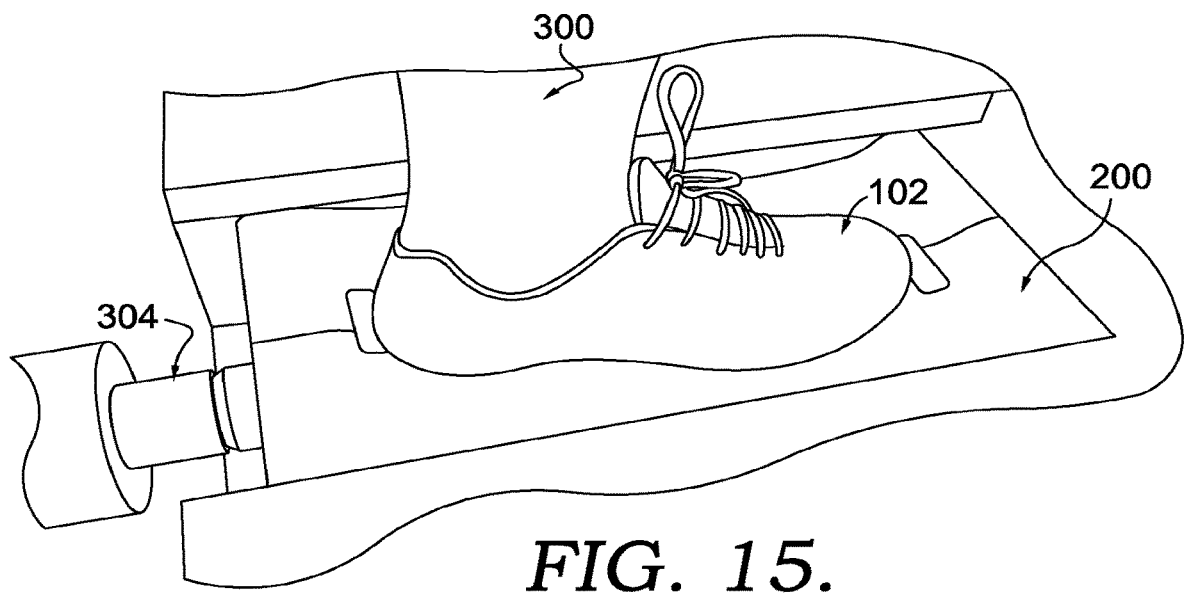
FIG. 15 depicts an injector injecting a polymeric foam composition into the mold of FIG. 14, in accordance with aspects hereof.

FIG. 3 depicts a first exemplary cross section of a mold 201, in accordance with aspects hereof. The mold 201 is comprised of a top platen 204 (also referred to as a top plate herein) having a top platen molding surface 206. The mold 201 is also comprised of a bottom plate 208 having a first molding surface 210 (also referred to as a bottom plate molding surface). The mold 201 forms a mold cavity 202. The mold cavity, at this stage of the operation, is defined by the top platen molding surface 206, the first molding surface 210, and second molding surface 212 (also referred to as sidewall molding surfaces). Also depicted in the mold 201 is a single runner, a first runner 214. A runner is a channel through which molding material passes to the mold cavity 202. In an example of an aspect, an injector 304 (e.g., as seen in FIG. 15 hereinafter) delivers and injects a molding materials (e.g., the polymeric foam composition 130 and the polymeric composition 230) in the mold cavity 202. The first runner 214 terminates at the mold cavity 202 with a first runner port 216 on the second molding surface 212.

The top platen 204 is moveable in a vertical direction. As will be illustrated in FIGS. 5-10, the top platen 204 may be positioned by one or more mechanisms, such as a robotic arm. The vertical movement allows for the insertion, removal, and relative positioning of the top platen 204 within the mold cavity 202. The top platen is a tooling that positions and delivers an insert for incorporation into a sole formed through a direct attach process. The top platen may also serve as a molding surface against which an outsole is partially molded. The bottom plate 208 is also depicted as moveable in a vertical location. The movement of the bottom plate 208 is illustrated in FIGS. 5-10 hereinafter for positioning a molding surface, a material, or an insert appropriately for a direct attach process. The mold 201 is illustrated in simplified terms for purposes of description. It is contemplated that the mold 201 may be formed with any size, shape, and/or configuration. In use, the top platen molding surface 206 may be formed with a variety of curved surfaces or other features to appropriately mold an outsole or other component with an insert.

Figure 4:
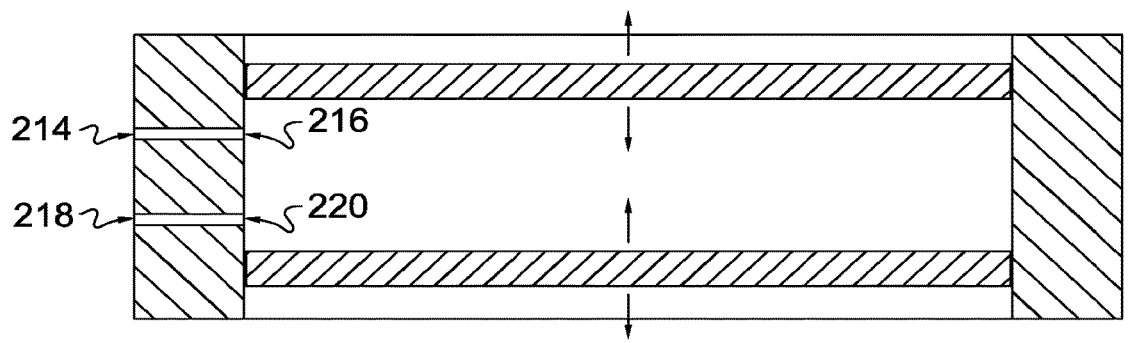
FIG. 4 depicts an example mold having two runners, in accordance with aspects hereof.

FIG. 4 depicts a second exemplary cross section of a mold 200, in accordance with aspects hereof. A difference between the mold 201 of FIG. 3 and the mold 200 of FIG. 4 is a number of runners in the molds. The mold 200 is comprised of the first runner 214 and a second runner 218. The second runner terminates in the mold cavity at a second runner port 220. It is contemplated that in use any number of runners may be used. A different runner for each material to be injected is contemplated. A common runner for all different materials to be injected is also contemplated. Further, multiple runners for a common material to be injected is contemplated. The size, shape, and/or configuration of the runners may be adjusted and merely an example for purposes of illustration.

As will be highlighted in FIGS. 5-10 hereinafter, the mold 200 having two runners allows for the polymeric composition forming the outsole to be injected through the second runner 218 at a position below the insert and the first runner 214 is used to inject the polymeric foam composition above the insert to form the cross section of a shoe depicted in FIG. 2. However, as will be appreciated, it is contemplated that movement of the top platen 204 and/or the bottom plate 208 may be effective to position the insert appropriately relative to a single runner configuration to achieve the cross section of a shoe depicted in FIG. 2.

FIGS. 5-10 depict a series of steps for direct attaching a sole containing an insert to a lasted shoe upper. The sequence of steps is illustrative in nature and is not limiting. It is contemplated that additional and/or alternative steps may be implemented. Further, the shape, size, and positioning of depicted elements is illustrative in nature and may instead reflect specific models and sizes of footwear being manufactured in reality.

Figure 5:
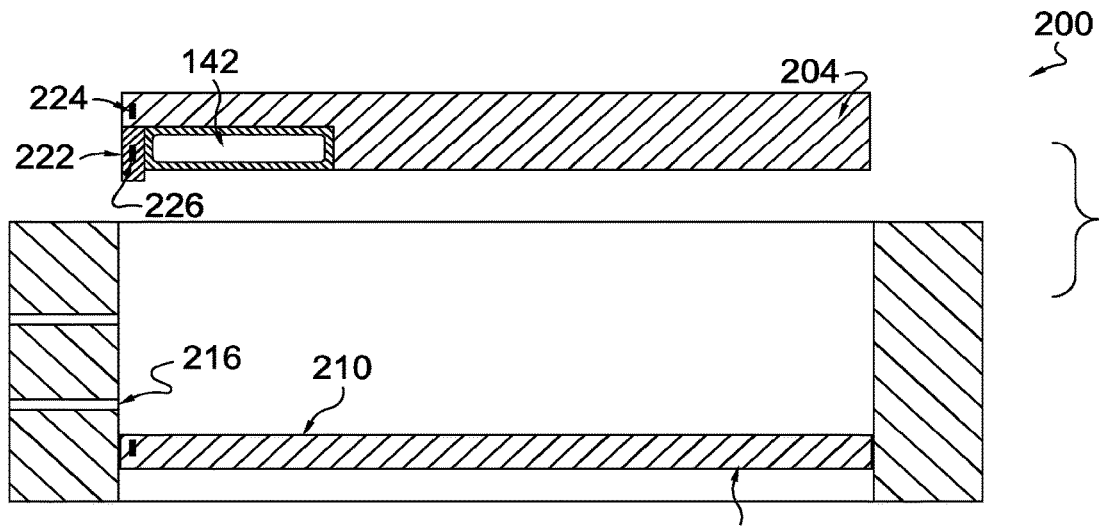
FIG. 5 depicts a cross section of positioning a top platen maintaining an insert in a mold, in accordance with aspects hereof.

FIG. 5 depicts the mold 200 receiving the top platen 204 having attached thereto the insert 142 by a mask 222, in accordance with aspects hereof. The top platen 204 may be positioned by the molding machine and/or by a robotic mechanism, such as a robotic arm. As such, the insert 142 may be secured to the top platen 204 by an operator clear of the mold 200 structure. Once the insert 142 is secured to the top platen 204 by an operator (or machine), the top platen 204 is positioned in the mold 200 to form, at least in part, the mold cavity.

The insert 142 is secured to the top platen 204 for positioning in the mold cavity. The securement of the insert 142 may be accomplished using a variety of techniques, such as compression, adhesion, magnetism, clamps, and the like. FIG. 5 depicts a mask 222 for securing the insert 142 to the top platen 204. The mask 222 is a U-shaped component that surrounds the sidewall forming portions of the insert 142. The mask 222 may engage with a portion of the insert, such as an edge, a flange, an aperture, a surface, or the like to secure the insert 142 with a portion of tooling, such as the top platen 204. In the present example, an outsole material will be injected into the mold cavity and intended to engage with a ground-facing portion of the insert 142. As a result, the mask does not interfere with or obstruct the ground-facing surface of the insert 142 from contacting the to-be injected material. Instead, the mask 222 engages with the surfaces of the insert 142 forming the heel end and/or sidewalls to maintain the insert 142 to the top platen 204. The mask 222 is secured, in this example, to the tooling through magnetism. For example, a mask magnet 226 is incorporated in the mask 222. The mask magnet 226 is oriented to have a magnetic attraction with the top platen 204. The top platen 204, in this example, includes a top magnet 224 that is oriented to have a magnetic attraction to the mask magnet 226. The top magnet may be integrated (e.g., embedded) and secured into the top platen 204. The magnetic attraction between at least the top magnet 224 and the mask magnet 226 provides a securing force to maintain the mask 222 and associated insert 142 in connection with the top platen during a positioning process of a direct attach operation. It is understood that any number of magnetic elements may be implemented in the mask 222 and/or the top platen 204.

Further, it is contemplated that the positioning of the mask magnet 226 relative to the mask 222 is effective to position and align the mask 222 with a corresponding portion of the top platen 204. The positioning, alignment, and orientation that is guided by the magnetic attraction is consequently effective to align, position, and orient the insert 142 relative to the top platen 204, which as a result align the insert 142 with the mold 200 as a whole. Further, it is contemplated that one or more features (e.g., recesses, protrusions) are formed in the top platen 204 that correspond with features of the insert 142 that are to be positioned adjacent thereto. These features of the top platen may aid in alignment, positioning, and orientation of the insert 142 relative to the top platen 204.

The mask 222 is effective to serve as a gasket, seal, or other barrier to prevent the spread of the polymeric foam composition or polymeric composition around the insert proximate the molding surfaces of the mold 200. The mask 222 is effective to mask a surface of the insert 142 from injected materials. The mask 222 is effective to contain injected materials from extending between the insert 142 and a molding surface of the mold 200. For example, to form a visible insert on the article of footwear sole sidewall, the mask 222 is positioned on the insert 142 prior to injecting the polymeric foam composition. After the curing (or at least partial curing) of the polymeric foam composition to form a portion of the sole, the mask 222 is removed from the insert 142 to expose the insert 142 as forming a portion of the sole sidewall without the polymeric composition obscuring the insert 142 at the sole sidewall. The mask 222 is therefore an effective tooling component to protect a surface of the insert 142 from injected material and to potentially prevent migration of the injected material between the insert 142 and the molding surface to limit cross-contamination between different injected materials.

The mask 222 may be formed from any material. In an exemplary aspect, the mask 222 is formed from a polymer-based material. Further, it is contemplated that the mask 222 is compliant and resilient in nature. For example, the mask 222 may be sized to compress a portion of the insert 142, such as to compress the surfaces masked by the mask 222. This scaled sizing allows for a mechanical compression securement between the insert 142 and the mask 222. To apply and remove the mask 222 from the insert 142, the mask may comply (e.g., distort) to fit around/on the insert. Additionally or alternatively, the insert itself may comply with the mask to create a removable mechanical compression securement there between. In a specific example, the insert is an airbag for a shoe sole, where the airbag forms about 270 degrees of the heel end sole sidewall. A mask is formed from a polymer material to mask the surface of the insert forming the about 270 degrees of sidewall. The mask is sized to cover the surface of the insert while creating a compressive force on the insert. Following injection of a midsole forming polymeric foam composition, the mask is removed to expose the insert forming about 270 of the sole sidewall. Without the mask, the injected polymeric foam composition may obscure the insert and prevent the insert from forming the sole sidewall, at least in part. As such, the shape and size of the mask will change to accommodate the insert and/or the intended sole.

Further, the mask 222 is illustrated as extending below a bottom surface of the insert 142 for illustration purposes. However, in practice, a mask, such as the mask 222 may not extend above and/or below the insert being masked. Further, it is contemplated that a portion of the insert sidewall immediately adjacent a top surface and/or a bottom surface is not masked by the mask to allow for a coverage of injected polymeric foam composition. As previously discussed, the tooling is illustrated in simplistic form for purposes of the present disclosure and ease of comprehension, but in use, the tooling may have non-planar surfaces that accommodate and fit to the elements inserted into the mold cavity, such as the insert and/or the mask. For example, instead of the depicted mask 222 extending below a bottom surface of the insert 142, the mask 222 may terminate at or before the bottom surface of the insert 142. A raised portion of the bottom plate 208, such as on the first molding surface 210, may protrude to serve as a physical barrier to the injected outsole polymeric composition from extending past a heel end of the insert 142. Stated differently, in practice, the mask exclusively covers a portion of the insert sidewall without extending beyond a top surface or bottom surface of the insert. The first molding surface 210 may instead limit the outsole material from extending in a heelward direction past the heel end of the insert. Similarly, if the insert is positioned in other location of the article of footwear, the mask and the molding surface may work in any combination to control and limit the distribution of the injected materials to intended locations.

While the mask is depicted as a U-shaped element, it is understood that the mask may have any shape to serve as an effective mask for a portion to be masked. For example, the mask may be linear, curved, dimensional, planar, or the like. Further, the mask may be configured to self-secure to a component or the mask may be configured to be secured to other tooling (e.g., mold), or secure to the component through additional securements (e.g., clips, pins, adhesive, mechanical engagement). Therefore, the mask may be any size, shape, and configuration in accordance with aspects hereof.

FIG. 6 depicts the mold 200 with the top platen 204 positioning the insert 142 in the mold cavity to be received by the injected polymeric composition 230 forming the outsole 138, in accordance with aspects hereof. As previously discussed, the top platen 204 may be positioned by a robotic element, a portion of the molding machine, and/or manually positioned by an operator. The positioning of the top platen 204 in the mold 200 positions the insert 142 along the second molding surface 212 allowing for the insert 142 to form a portion of a sidewall of the formed shoe. When stated herein that the insert contacts a molding surface (e.g., second molding surface) that one or more intermediate materials not specific to the insert 142 may be positioned between the insert 142 and the molding surface. For example, the material may be a mold release agent, a securing mechanism, a spacer, a gasket, and the like. For example, the mask 222 may extend between the insert 142 and the second molding surface 212, but it is still considered that the insert 142 contacts the second molding surface 212 as other materials to be molded will not contact the portion of the second molding surface 212 adjacent the mask 222. Stated differently, the insert 142 forms an exterior surface of the sole when it "contacts" the molding surface. Therefore, physical connection between the molding surface and the insert is not necessary for the insert to contact the molding surface so long as the insert is positioned in the mold to form an externally visible portion of the footwear sole sidewall.

In the examples of FIGS. 5-10, an outsole is formed in the mold 200 as part of the direct last process; however, it is contemplated that the outsole is separately formed and attached to the polymeric foam composition responsible for the direct attach coupling at a later time or during the direct attach process. As depicted in FIG. 6, the polymeric composition 230 is injected into the mold cavity 202 through the first runner port 216. The polymeric composition 230, as previously described, may be any polymer-based composition. While the polymeric composition 230 is depicted in a liquid-like state (e.g., flowing condition), it is contemplated that the polymeric composition could be in any state, such as pellets, powder, formed, and the like. It is contemplated that the polymeric composition 230 is a foamed composition or a non-foamed composition. The polymeric composition 230 when cured may be flexible (e.g., rubber-like outsole) or at least partially rigid (e.g., cleat-like structure).

The polymeric composition 230 is injected into the mold cavity 202 and contacts the first molding surface 210 of the bottom plate 208. The first molding surface, while depicted in a planar configuration for illustrative purposes, is contemplated to have a complex surface suitable for forming elements of an outsole. For example, the first molding surface may have indentations that form a tread structure (e.g., lugs) that will serve as a ground-contacting surface for the formed shoe. Additionally, while the outsole 138 is depicted as extending across the entire bottom plate 208, it is contemplated that the polymeric composition 230 may only be deposited (e.g., injected) onto portion of the first molding surface 210. For example, the polymeric composition 230 may form an outsole structure at the heel end and/or the toe end. Alternatively, the polymeric composition 230 may only form an outsole in the toe and as the insert 142 may serve as a ground-contacting surface in the heel end. The insert 142, as previously discussed, may be positioned at any location of the article of footwear sole and therefore may serve as a ground-contacting portion of the sole at any location of the sole. In this example, the polymeric composition 230 may be deposited onto the first molding surface 210 in locations other than where the insert 142 is positioned opposite. The selective placement of the polymeric composition 230 may be accomplished through intentional structures formed with the first molding surface 210 to direct and collect the polymeric composition 230 for curing as a selectively formed outsole portion.

Figure 7:
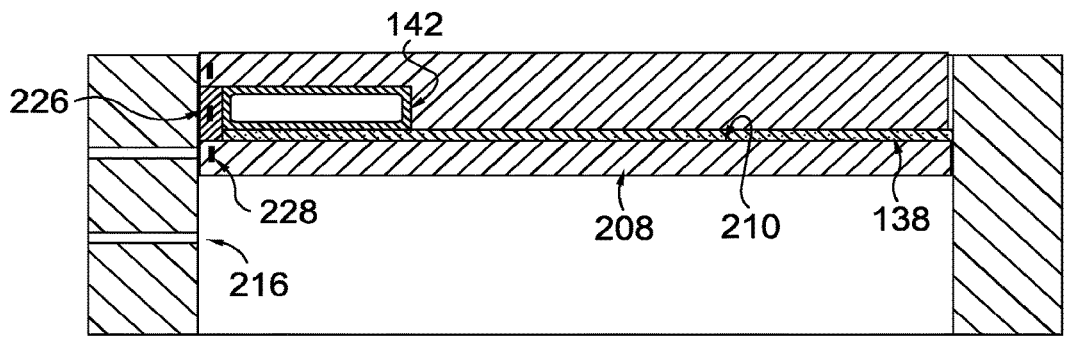
FIG. 7 depicts the polymeric composition and the insert of FIG. 6 in contact through movement of a bottom plate, in accordance with aspects hereof.

FIG. 7 depicts the bottom plate 208 moving in a vertical direction within the mold to position that allows for physical interaction between the polymeric composition 230 and the insert 142. The positioning of the bottom plate 208 and the associated first molding surface 210 may be accomplished through the movement of the bottom plate 208 and/or the movement of the top platen having the insert 142 secured thereto. In an aspect, the bottom plate 208 moves such that at least the first molding surface 210 moves past the first runner port 216, as depicted in FIG. 7. The positioning of the first molding surface above (from a position originally below) the first runner port 216 allows for the severing of material from the first runner port 216 following the injection of the polymeric composition 230. This severing of the material limits tooling marks as the material cures.

The positioning of the polymeric composition 230 in contact with the insert 142 occurs while the polymeric composition 230 is capable of forming a bond with the insert 142 to couple the polymeric composition 230 with the insert 142. For example, prior to the polymeric composition 230 achieving a full cure, the polymeric composition 230 and the insert contact one another to form a coupling as the polymeric composition achieves a cure. The insert 142, as previously discussed, may be formed from a material to which the polymeric composition 230 has an affinity for forming a bond. For example, if the polymeric composition 230 is a PU-based material, the insert 142 may be a TPU-based material, at least in part. In this example, PU and TPU have a relatively strong affinity for forming a coupling there between.

The positioning of the bottom plate 208 in proximity of the insert 142 also allows for the mask magnet 226 to be attracted to a bottom plate magnet 228. This attraction of the mask magnet 226 and the bottom plate magnet 228 allows for the release of the mask 222 from the top platen 204. The release occurs, in this example, through an offsetting magnetic attraction between the mask magnet 226 and the bottom plate magnet 228 relative to the magnetic attraction between the mask magnet and the top magnet 224. Further, an adhesive effect the polymeric composition 230 has on the contacted insert 142 overcomes the maintaining force of the insert 142 to the top platen 204, as will be depicted in FIG. 8 hereinafter.

The top platen 204 may remain in the mold for a prescribed period of time to serve as a molding surface for the outsole 138 as the material cures. Further, the top platen may remain in the mold for a prescribed period of time until a sufficient coupling occurs between the insert 142 and the outsole 138. In the alternative, the top platen 204 may be removed from the mold immediately after the insert 142 contacts the outsole 138 and is transferred to the outsole 138.

Figure 8:
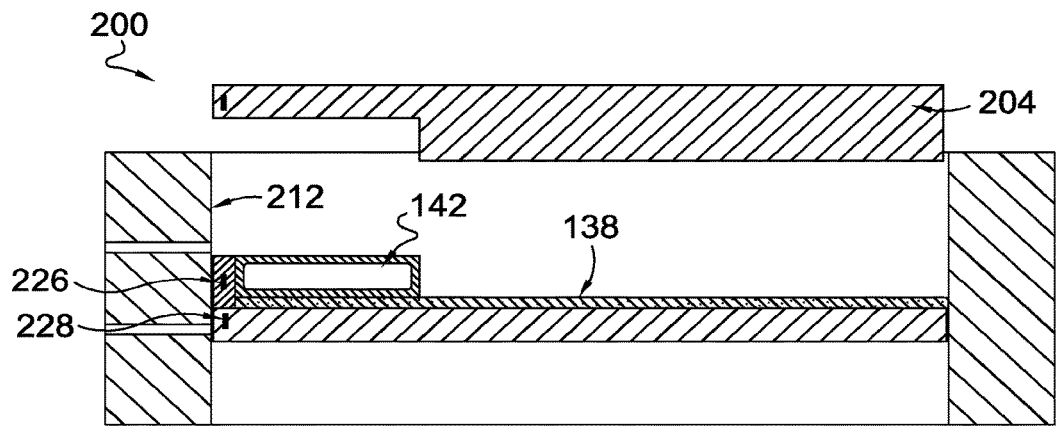
FIG. 8 depicts the top platen being removed from FIG. 7 with the insert being maintained by the polymeric composition, in accordance with aspects hereof.

FIG. 8 depicts the top platen 204 being removed from the mold 200 after depositing the insert 142 to be coupled with the outsole 138, in accordance with aspects hereof. Additionally, the bottom plate is depicted as being positioned such that the insert 142 is below the second runner port; however, it is contemplated that the removal of the top platen 204 and the positioning of the bottom plate may be decoupled and independent operations.

Figure 9:
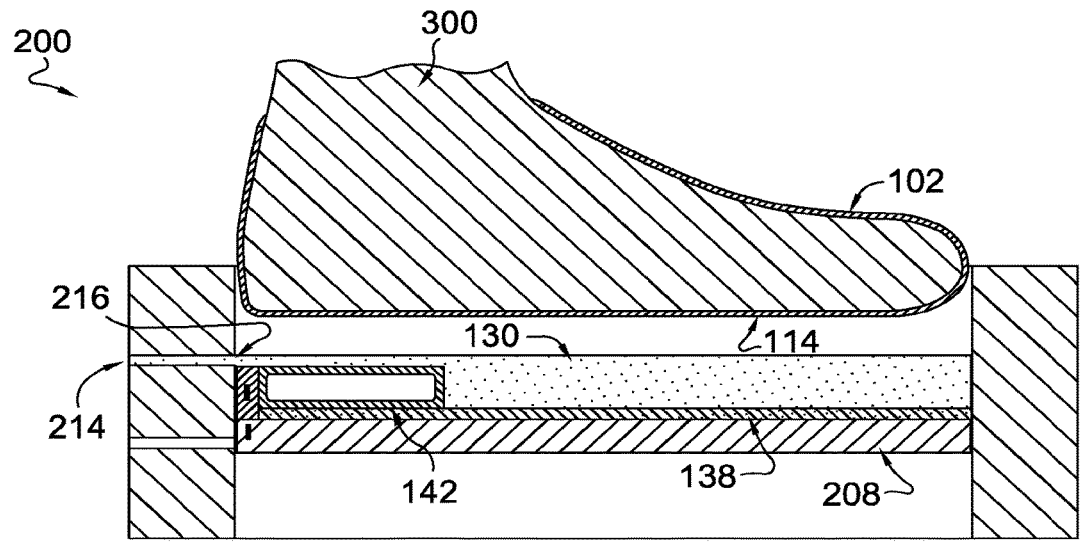
FIG. 9 depicts a lasted upper positioned at the mold of FIG. 8 with a polymeric foam composition injected into the mold, in accordance with aspects hereof.

FIG. 9 depicts the upper 102 on a last 300 being positioned in the mold and the polymeric foam composition 130 being injected into the mold, in accordance with aspects hereof. In this example, the polymeric foam composition is injected into the mold between the lasted upper 102 and the insert 142. However, it is contemplated that the relative positioning may be different for alternative implementations. Having the polymeric foam composition 130 inserted into the mold at a position between the insert 142 and the plantar region 114 of the upper 102 allows for the polymeric foam composition to be positioned between the outsole 138 and the upper 102 to serve as a direct attach material for the shoe. Additionally, by positioning the insert 142 below the injection location, the insert 142 does not interfere with the injection of the material, in at least this example. A prescribed amount of the polymeric foam composition is injected into the mold, such that after the foaming processes completes and the polymeric foam composition is cured, the intended density, fill, and molded characteristics are achieved by the polymeric foam composition.

Figure 10:
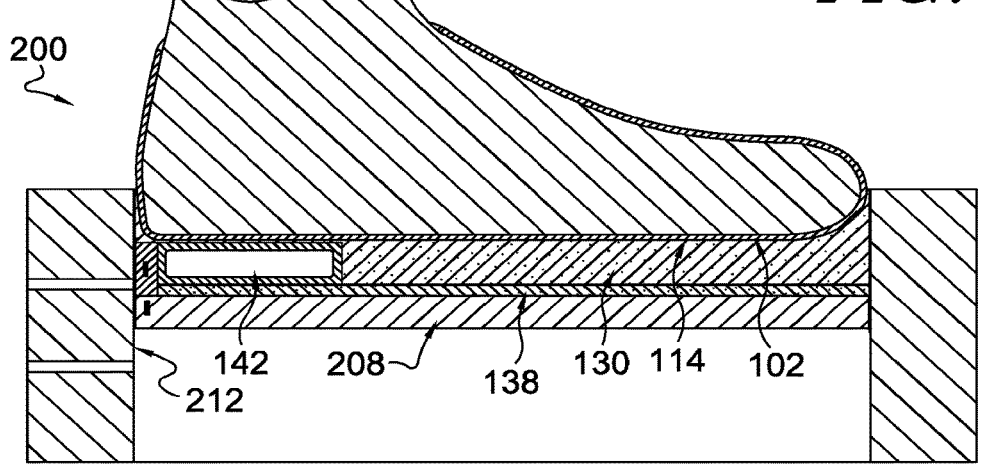
FIG. 10 depicts the polymeric foam composition engaging with the upper, from FIG. 9, in accordance with aspects hereof.

FIG. 10 depicts the sole being positioned relative to the upper 102 so that the polymeric foam composition 130 mechanically engages with the upper 102. The mechanical engagement may occur through the positioning and/or through an expansion of the polymeric foam composition 130 as a foaming reaction occurs. As the polymeric foam composition 130 cures while in contact with the upper 102, the direct attach process couples the sole and the upper 102 without additional adhesives. The mechanical engagement between the polymeric foam composition 130 and the upper 102 provides a mechanical coupling and/or chemical coupling to join the sole and the upper 102. The movement of the bottom plate 208 additionally allows for the severing of material extending from the second runner used to inject the polymeric foam composition 130. The severing of the material aids in limiting tooling marks on the cured article, in an example aspect.

The polymeric foam composition 130 extends along the entire upper plantar region 114 of the upper 102. In this arrangement, the polymeric foam composition serves as both a binder of sole elements (e.g., insert 142, outsole 138) to the upper 102 and as an impact attenuating layer of the sole. Specifically, the polymeric foam composition 130 extends between the insert 142 and the plantar region 114 to couple the insert 142 and the upper 102. In alternative aspects, it is contemplated that the insert 142 includes an adhesive or other bonding agent to directly couple to the upper 102 in the absence of the polymeric foam composition 130.

As seen in the toe end of FIG. 10, the bottom plate 208 could include contouring that provides a traditional molding surface to form a traditional sole profile. However, for illustrative purposes, the elements of FIGS. 5-10 have been simplified.

Following the mechanical engagement of polymeric foam composition 130 and the upper 102, the polymeric foam composition 130 may be allowed to cure for a prescribed time. The curing of the material allows for the molded surfaces to be maintained while also ensuring a coupling between elements is sufficient to prevent a decoupling from occurring. Following the prescribed curing time, the article may be removed from the mold 200 as a formed article of footwear having a direct attached sole with a visible insert formed in the sole.

Figure 11:
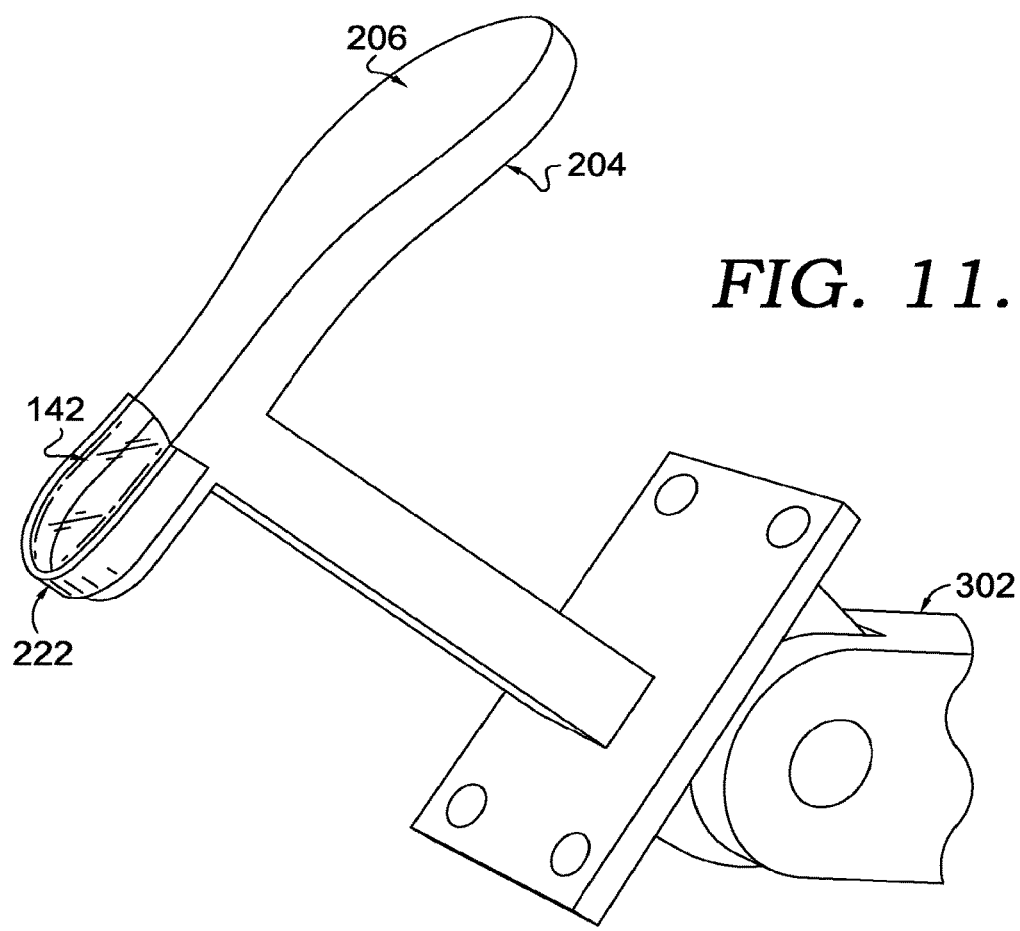
FIG. 11 depicts a perspective view of a top platen maintaining an insert having a mask, in accordance with aspects hereof.
Figure 12:
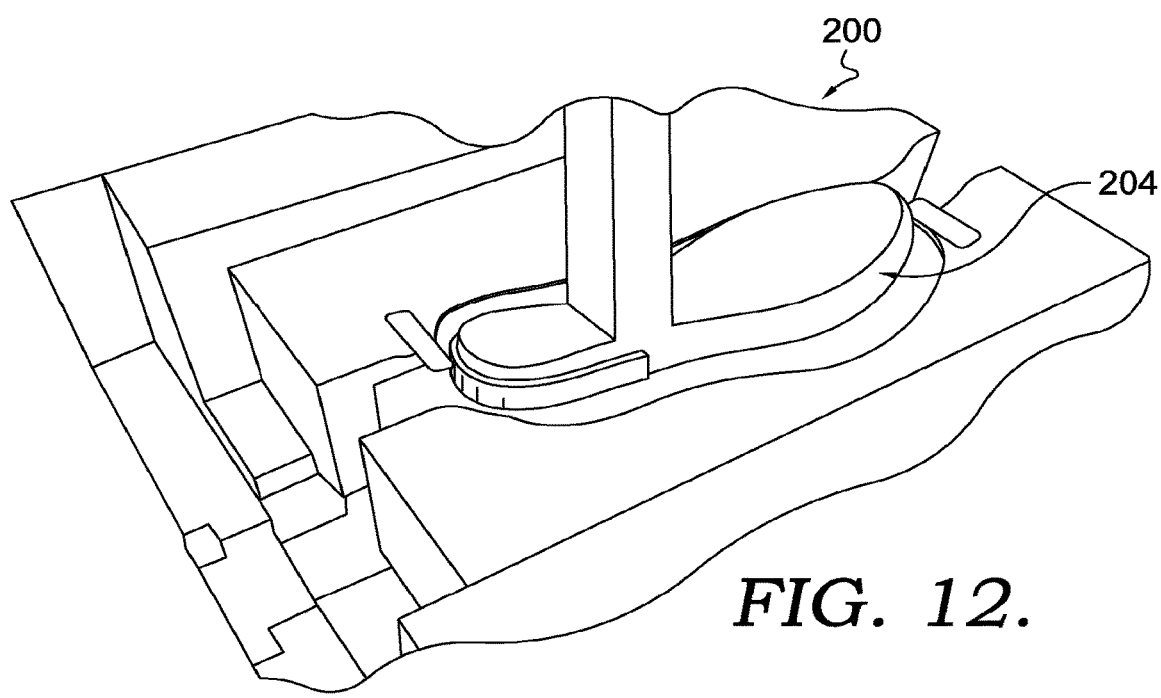
FIG. 12 depicts the top platen of FIG. 11 positioned in a mold, in accordance with aspects hereof.
Figure 13:
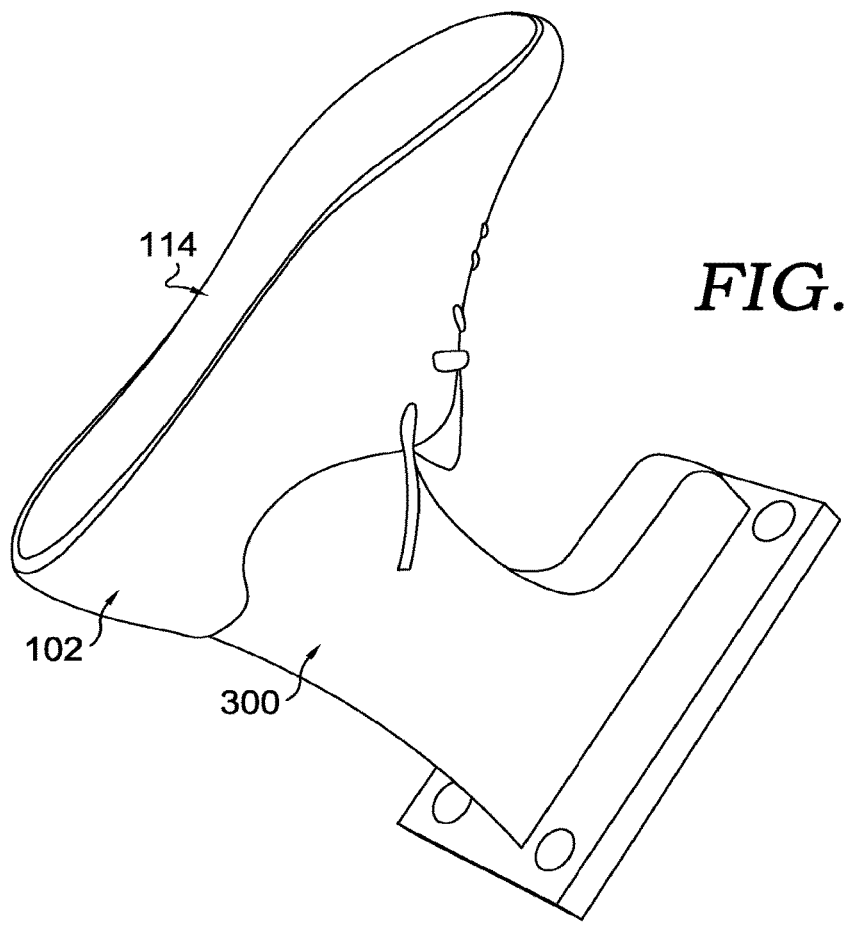
FIG. 13 depicts a perspective of a lasted upper, in accordance with aspects hereof.
Figure 14:
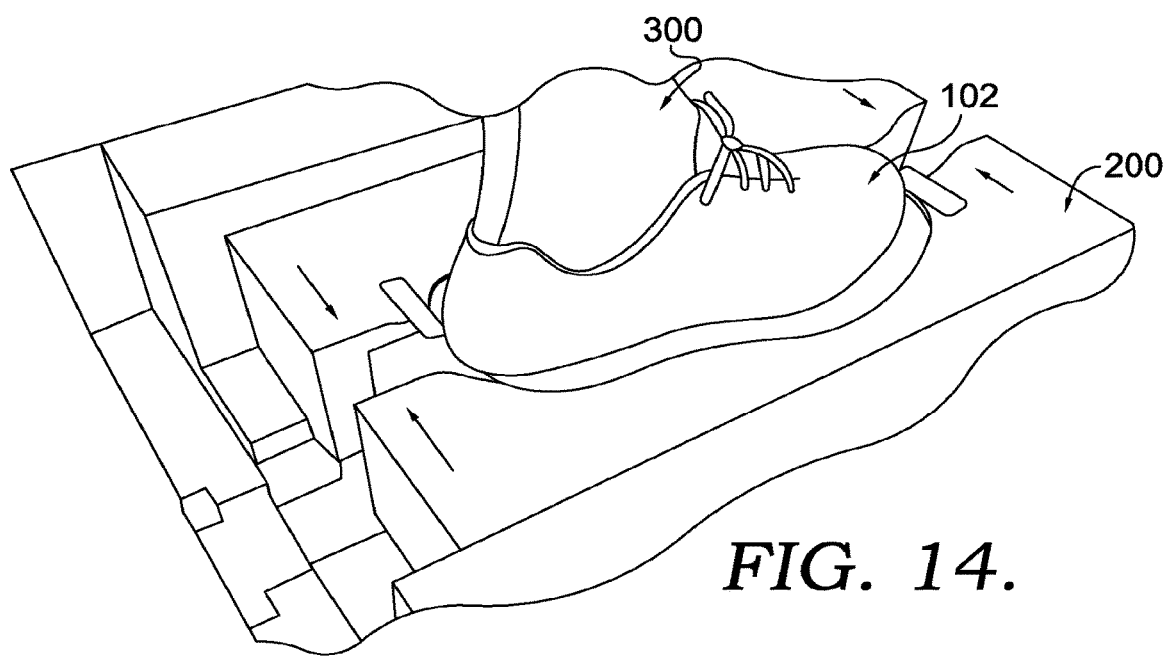
FIG. 14 depicts the lasted upper of FIG. 13 positioned at the mold of FIG. 12, in accordance with aspects hereof.

FIGS. 11-15 depict a more illustrative perspective of the previously discussed steps of FIGS. 5-10. Specifically, FIG. 11 depicts the top platen 204 having the insert 142 secured thereon by way of the mask 222, in accordance with aspects hereof. The robotic element 302 is effective to position the top platen 204 in the mold 200, as depicted in FIG. 12, in accordance with aspects hereof. As seen in FIG. 12, it is contemplated that the mold 200 is a ring mold that splits along the cross section depicted in FIGS. 5-10. The ring mold separates to allow for the positioning of the top platen 204 having the insert 142 and the mask 222, as seen in FIG. 12 and for receiving the upper 102 on the last 300, as seen in FIG. 14. As the ring mold closes around the inserted elements, a seal may be formed between a portion of the inserted elements (e.g., the mask 222, the insert 142, the top platen 204, the upper 102, and/or the last 300). Forming a seal contains an injected material to a portion of the mold cavity for which it is intended. For example, the mold 200 closing around the top platen 204 and the mask 222 in FIG. 12 prevents blow past of the polymeric composition during the forming of an outsole. Blow past is the unintended spreading of the polymeric composition around the insert 142. Similarly, the closing of the mold 200 around the upper 102 in FIG. 14 while the insert and the mask are contained in the mold may also prevent a blow past as the polymeric foam composition is injected. The prevented blow past in FIG. 14 prevent the injected polymeric foam composition from obscuring the insert 142 on the sole sidewalls being formed.

As the rings close to form the mold 200 of FIG. 12, the outsole material may be injected into the mold 200 and formed, at least in part, to couple with the insert 142. FIG. 13 depicts the upper 102 on the last 300, in accordance with aspects hereof. The last 300 may be connected, at least temporarily, to a robotic element to position the last 300. The robotic element may be the same or similar to the robotic element 302 of FIG. 11. FIG. 14 depicts the upper being positioned in the mold 200. Rings of the mold 200 may close to secure the upper for an injection of polymeric foam composition to form a direct attached sole thereon. FIG. 15 depicts the mold 200 secured around the upper 102 with an injector 304 injection a polymeric composition into the mold 200, in accordance with aspects hereof. The injector 304 aligns with a runner (e.g., the first runner 214 of FIG. 9) to insert polymeric material into the mold 200.

While specific tooling is depicted in FIGS. 11-15, it is understood that is exemplary in nature and not limiting. Alternative configurations are contemplated and may be implemented.

Figure 16:
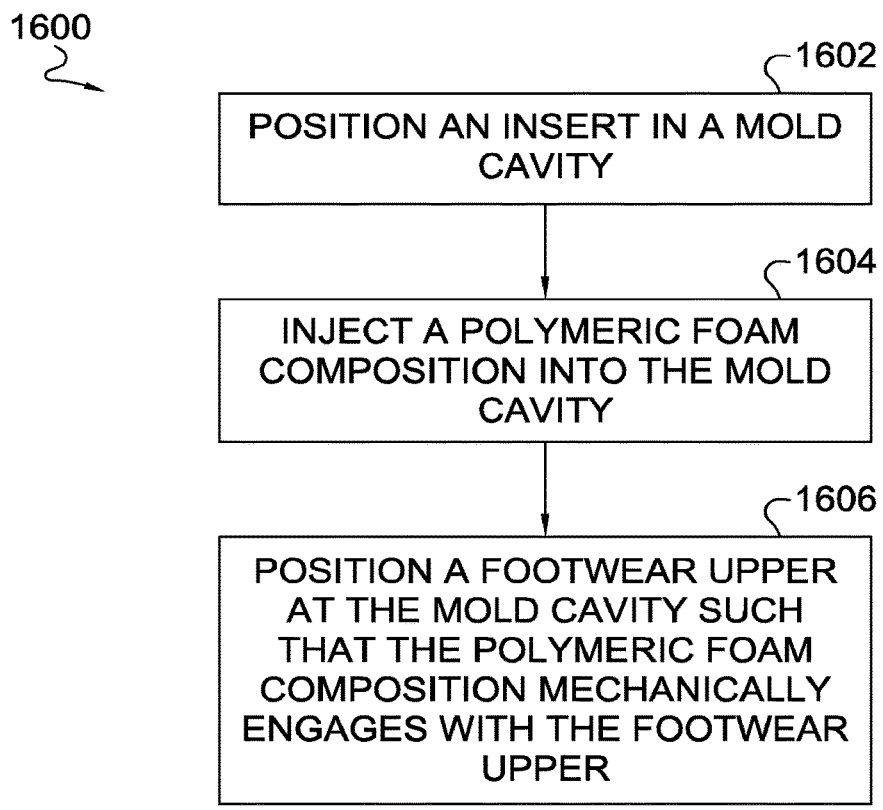
FIG. 16 depicts a flow diagram for manufacturing a direct attached sole having an insert forming at least a portion of the sole sidewall, in accordance with aspects hereof.

FIG. 16 depicts a flow diagram 1600 representing a method of making an article of footwear having an insert forming a portion of a sole sidewall, in accordance with aspects hereof. At a block 1602, an insert is positioned in a mold cavity. The insert is positioned such that it ultimately forms a portion of an external sidewall of the sole that will be direct attached to an upper. An exemplary positioning that achieves the insert as a portion of a sole sidewall includes contacting the insert with a molding surface that ultimately forms the sole sidewall. The insert may be the insert 142 of FIG. 1, for example. The insert may be an airbag. The insert may be positioned by a top platen having the insert secured thereto being positioned such that the insert is provided into the mold cavity. A block 1604 represents injecting a polymeric foam composition into the mold cavity. The polymeric foam composition creates, at least a portion, of the sole direct attached with an upper. The formation of the article of footwear may include a prior formation of an outsole within the mold cavity or separately. The prior formed outsole may then be coupled with the injected polymeric foam composition of the block 1604. A block 1606 provides for positioning a footwear upper at the mold cavity such that the polymeric foam composition mechanically engages with the footwear upper.

Figure 17:
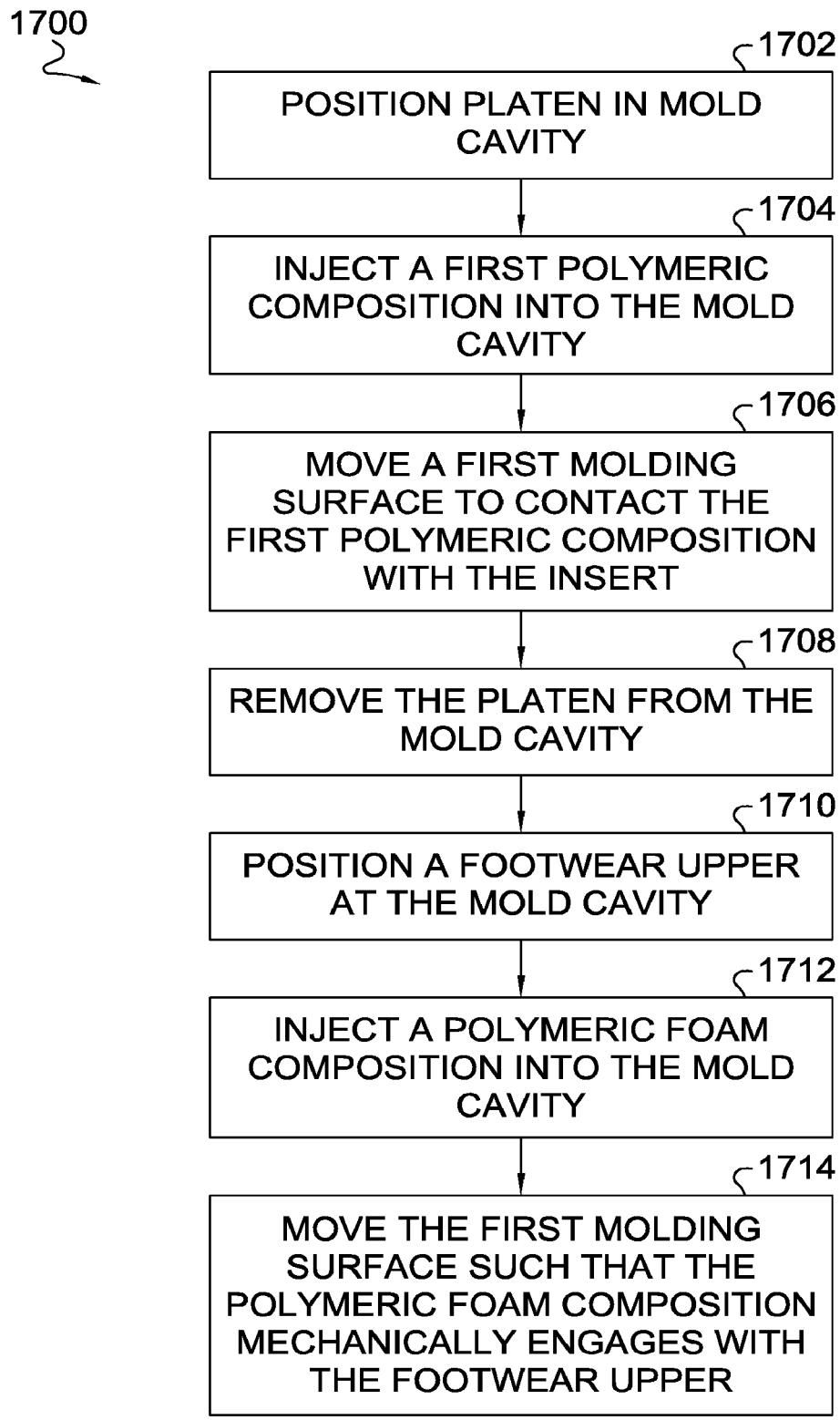
FIG. 17 depicts another flow diagram for manufacturing a direct attached sole having an insert forming at least a portion of the sole sidewall, in accordance with aspects hereof.

FIG. 17 depicts a flow diagram 1700 representing another method of making an article of footwear having an insert forming a portion of a sole sidewall, in accordance with aspects hereof. At a block 1702, a platen is positioned in a mold cavity. For example the, top platen 204 of FIG. 5 is positioned in a mold cavity of the mold 200. It is contemplated that the platen positioned in the mold cavity of the block 1702 has secured thereto an insert, such as the insert 142 of FIG. 5. The platen may also have contours and surfaces effective to form an upper-facing surface of a to-be molded outsole portion. In this example, the platen may have a portion configured to receive the insert, such as a recesses sized to maintain and position the insert at an appropriate location relative to the upper-facing molding surface of the platen.

At a block 1704, a first polymeric composition is injected into the mold cavity. The first polymeric composition may be any composition in any state, such as a to-be-cured polymeric composition, a polymeric composition above a glass transition temperature, a polymeric composition that is activate for forming bonding by subsequent processing (e.g., heat treatment, pressure treatment). The first polymeric composition, in an exemplary aspect, is a PU or EVA, however additional/alternative polymeric compositions are contemplated. The first polymeric composition is injected, in this example, through a runner of the mold. The runner may be a specific runner for injecting only the first polymeric composition or it may be a runner that is used or injecting additional/alternative polymeric compositions (e.g., polymeric foam composition).

At a block 1706, a first molding surface is moved to contact the first polymeric composition with the insert. The first molding surface is a ground-contacting molding surface of a bottom plate, such as the bottom plate 208 of FIG. 6, in this example. The bottom plate may be moved through an actuator, such as a pneumatic actuator, a hydraulic actuator, an electric actuator, a cam assembly, and the like. The first molding surface forms the ground-contacting surface of the outsole being formed at the block 1706. Therefore, the first molding surface may include one or more features that form an appropriate structure (e.g., treads, lugs, cleats) within the ground-contacting surface of the outsole. An adhesion is formed between the first polymeric composition and the insert through the contact between the two. This adhesion allows for the insert to remain in contact with the first polymeric composition for coupling there between.

At a block 1708, the platen is removed from the mold cavity. In this example, the platen is removed, such as through a robotic mechanism, while the insert previously coupled thereto is maintained by the previously injected first polymeric composition. In this way, the first platen served as a positioning tooling for appropriately placing the insert within the mold and providing a reactive force against the movement of the first molding surface allowing for sufficient contact between the insert and the first polymeric composition to form an adhesion there between. In aspects, the platen also serves as an upper-facing molding surface for the first polymeric composition to form a prescribed surface of the outsole.

At a block 1710, a footwear upper is positioned at the molding cavity. The upper may be a lasted upper, such as the upper 102 having the last 300 of FIG. 9. By placing the upper at the mold cavity, the upper serves as a molding surface of the mold cavity. However, unlike a traditional molding surface where there is an expectation of a release from the molding surface, the upper that contact a polymeric foam composition is intended to form a coupling there between to direct attach the formed sole with the upper. In reality, a portion of the upper extends into the mold cavity when the upper is positioned at the mold cavity. The upper extends into the mold cavity as there is, in an example aspect, an expectation that the polymeric foam composition infiltrates at least a portion of the upper material(s) to create a mechanical engagement between the upper and the polymeric foam composition. For example, a plantar portion of the upper may extend into the mold cavity while other portions of the upper (e.g., throat, ankle collar, or vamp) are maintained outside of the mold cavity.

At a block 1712, a polymeric foam composition is injected into the mold cavity. The polymeric foam composition may be in a pre-foamed state during the injection. A foaming operation may occur subsequent to the injection. The polymeric foam composition may be any polymeric composition, such as a PU, EVA, and other polymer-based materials. The injection of the polymeric foam composition may occur through a runner that is different from a runner used to previously inject the polymeric composition of the block 1704. Alternatively, a common runner may be used to inject both the polymeric composition and the polymeric foam composition. An amount of polymeric foam composition to be injected into the cavity may be prescribed for the size, style, and model of the shoe to be formed.

At a block 1714, the first molding surface is moved such that the polymeric foam composition mechanically engages with the footwear upper. The movement of the first molding surface results in the movement of the previously formed combination of the outsole and the insert as well. As such, the first molding surface movement causes a mechanical engagement between the polymeric foam composition and the upper, positioning the whole sole in closer proximity to the upper. It is contemplated that the bottom plate forming the first molding surface may stop moving into proximity of the upper prior to the contact of the polymeric foam material and the upper. In this situation, an expansion of the polymeric foam composition closes the remaining gap to allow for the eventual mechanical engagement between the polymeric foam composition and the upper. This mechanical engagement results in a coupling between the sole and the upper as a direct attach. The coupling may be chemical and/or mechanical. The polymeric foam composition, in an aspect, is allowed to cure, at least partially, prior to the formed article of footwear being removed from the mold cavity.

Figure 18:
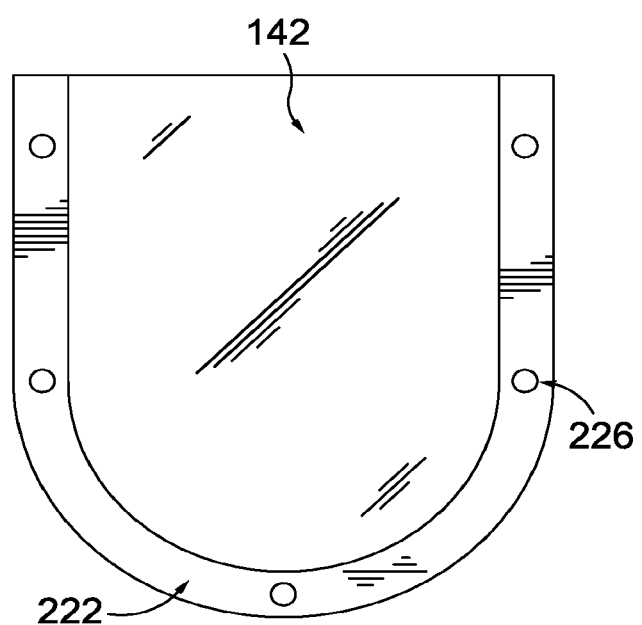
FIG. 18 depicts a view of an insert having a mask attached thereto, in accordance with aspects hereof.

FIG. 18 depicts a view of the insert 142 having the mask 222 attached thereto, in accordance with aspects hereof. The mask 222 surrounds the sidewall-forming surfaces of the insert 142 to prevent one or more injected materials into a mold (e.g., such as the mold 200 of FIGS. 5-10) from covering the sidewall forming surfaces of the insert 142. It is contemplated that the mask may be sized to compress a portion of the insert to maintain attached thereto. Further, it is contemplated that the mask may be shaped to expose portions of the insert to allow for interaction and bonding between the insert 142 and an injected material, such as a polymeric foam composition that is injected into a mold containing the insert 142. For example, toeward portion of the medial and lateral sidewalls of the insert may not be masked by the mask allowing for a foam transition to occur along the insert 142 sidewalls up until a toeward end of the mask when positioned on the insert 142, in the depicted example. Further, it is contemplated that the mask serves as a molding edge or surface for an injected polymeric foam composition such that the mask is capable of forming a molded shape, contour, element, and/or edge at the insert 142.

For convenience, a listing of features provided in FIGS. 1-15 and 18 is provided below.
Article of footwear—100
Upper—102
Upper medial side—106
Upper lateral side—108
Upper toe end—110
Upper heel end—112
Upper plantar region—114
Sole—104
Sole medial side—116
Sole lateral side—118
Sole toe end—120
Sole heel end—122
Upper-facing surface—123
Ground-facing surface—124
Medial sidewall—126
Lateral sidewall—128
Polymeric foam composition—130
Outsole—138
Insert—142
Insert internal cavity—144
Mold—200
Mold cavity—202
Top platen—204
Top platen molding surface—206
Bottom plate—208
First molding surface (e.g., ground-contacting molding surface)—210
Second molding surface (e.g., sidewall molding surface)—212
First runner—214
First runner port—216
Second runner—218
Second runner port—220
Mask—222
Top platen magnet—224
Mask magnet—226
Bottom plate magnet—228
Polymeric composition—230
Last—300
Robotic element—302
Injector—304

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of making an article of footwear having a direct attach sole, the method comprising:
positioning an insert in a mold cavity of a mold having a first molding surface forming a ground-contacting surface of a footwear sole, and a second molding surface forming a first sidewall portion of the footwear sole, wherein a mask contacts both the insert and the second molding surface allowing the insert to form a second sidewall portion of the footwear sole, wherein positioning the insert comprises mechanically engaging the mask to the insert and magnetically coupling the mask with a platen;
injecting a polymeric foam composition into the mold cavity containing the insert and the mask; and
positioning a footwear upper at the mold cavity, wherein the footwear upper is positioned such that the polymeric foam composition engages with the footwear upper to form the article of footwear having the insert forming the second sidewall portion of the footwear sole.

2. The method of making of claim 1, wherein the insert is an airbag.

3. The method of making of claim 1 further comprising:
prior to injecting the polymeric foam composition, injecting a first polymeric composition into the mold cavity, wherein the first polymeric composition contacts the first molding surface; and
positioning the first molding surface relative to the insert such that the first polymeric composition contacts the insert.

4. The method of making of claim 3, wherein the first molding surface moves to position the first molding surface relative to the insert.

5. The method of making of claim 3, wherein the insert moves to position the first molding surface relative to the insert.

6. The method of making of claim 3, wherein the positioning of the insert in the mold cavity comprises:
securing the insert to the platen with, in part, the mask; and
positioning the platen having the insert mechanically coupled thereon in the mold cavity.

7. The method of making of claim 3 further comprising decoupling the insert from the platen subsequent to positioning the first molding surface relative to the insert such that the first polymeric composition contacts the insert prior to injecting the polymeric foam composition.

8. The method of making of claim 3, wherein the injecting of the first polymeric composition injects the first polymeric composition through a first runner of the mold and the injecting of the polymeric foam composition injects the polymeric foam composition through a second runner of the mold.

9. The method of making of claim 8, wherein the first runner has a port on the second molding surface that is between the first molding surface and the insert during injecting of the first polymeric composition, and the second runner has a port on the second molding surface that is between the insert and the footwear upper during the injecting of the polymeric foam composition.

10. A method of making an article of footwear having a direct attached sole, the method comprising:
positioning a platen in a mold cavity of a mold, the mold having a first molding surface forming a ground-contacting surface of a footwear sole and a second molding surface forming a sidewall of the footwear sole, wherein the platen retains an insert and a mask magnetically coupled with the platen such that the mask contacts the second molding surface, the insert forms a portion of the sidewall of the footwear sole for the article of footwear;

injecting a first polymeric composition into the mold cavity, wherein the first polymeric composition contacts the first molding surface;

moving the first molding surface to contact the first polymeric composition with the insert;

removing the platen from the mold cavity while maintaining the insert in contact with the first polymeric composition;

positioning a footwear upper at the mold cavity;

injecting a polymeric foam composition into the mold cavity, wherein the polymeric foam composition contacts the first polymeric composition, the insert, and at least the second molding surface; and moving the first molding surface such that the polymeric foam composition engages with the footwear upper and secures the footwear sole with the footwear upper, wherein the footwear sole comprises the first polymeric composition, the insert, and the polymeric foam composition.

* * * * *